Figure 1:
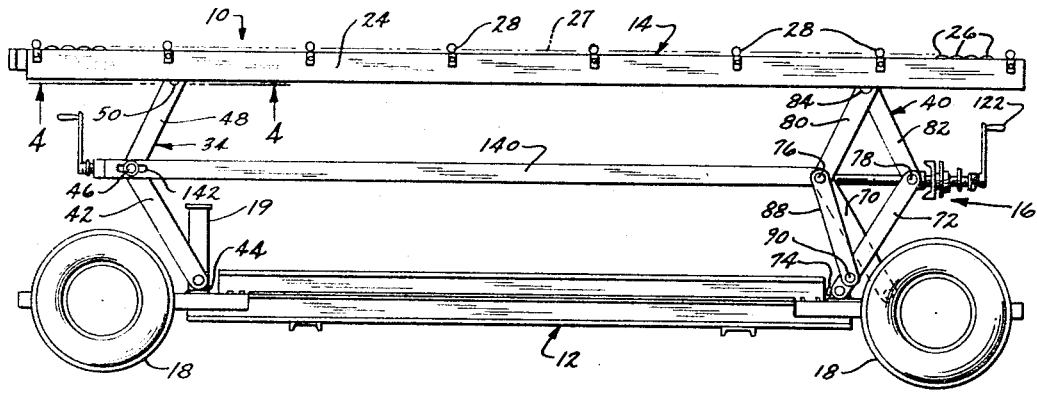

May 16, 1967

J. A. SZCZEPANIK 3,319,932

PALLET TRAILER HAVING A TOGGLE-OPERATED PLATFORM
TILTABLE ABOUT ONE OR MORE AXES

Filed Sept. 3, 1965

2 Sheets-Sheet 1

INVENTOR.
JOHN A. SZCZEPANIK

BY *Dennis McClone*

ATTORNEY

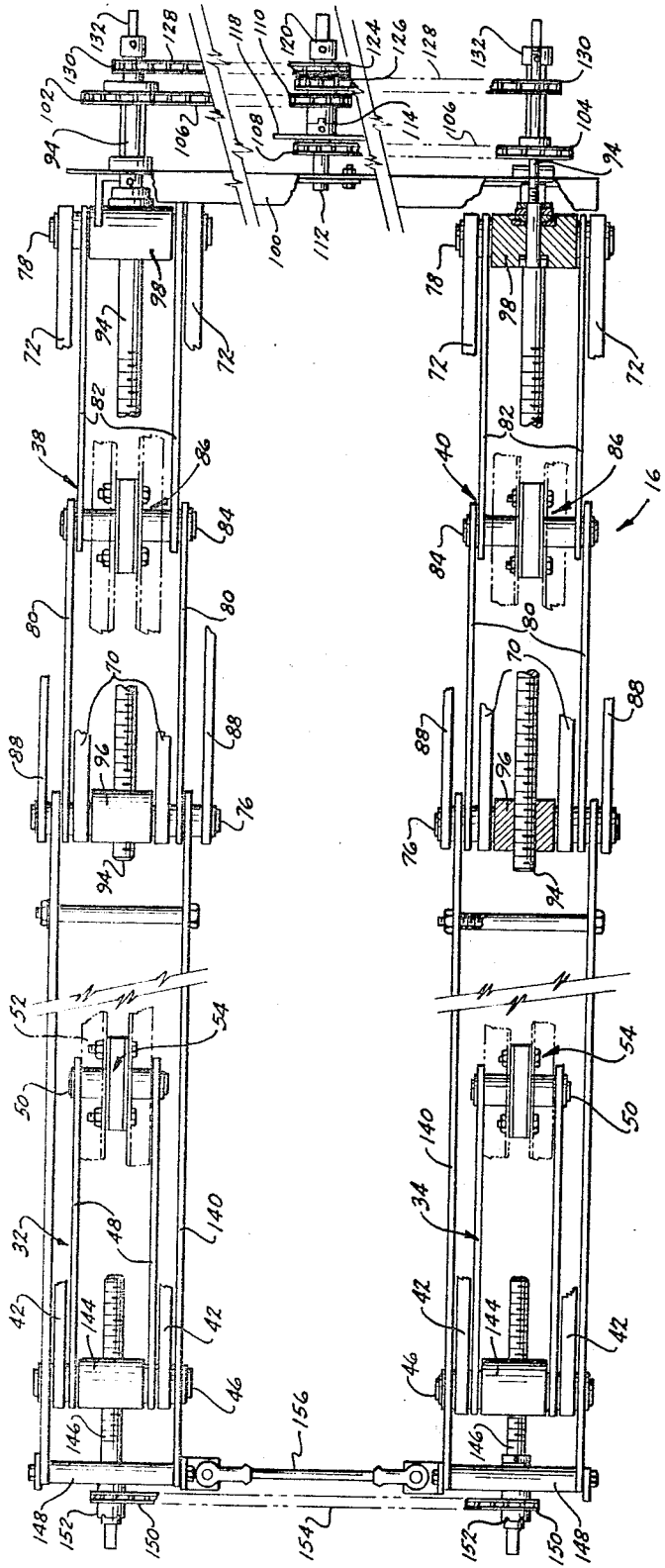

United States Patent Office 3,319,932
Patented May 16, 1967

3,319,932
PALLET TRAILER HAVING A TOGGLE-OPERATED PLATFORM TILTABLE ABOUT ONE OR MORE AXES
John A. Szczepanik, East Northport, N.Y., assignor to Dorr-Oliver Incorporated, Stamford, Conn., a corporation of Delaware
Filed Sept. 3, 1965, Ser. No. 484,898
8 Claims. (Cl. 254—9)

This invention relates to trailers having elevating-platforms and more specifically to such trailers wherein the platform is elevated by toggle linkages arranged to permit tilting of the platform with respect to the trailer base.

Although toggle-operated, elevating-platform trailers are known as shown by U.S. Patent 763,027 to Scott, such trailers have not heretofore been satisfactory for handling heavy palletized loads which are transferred by sliding the load to and from the trailer platform. The problem accrues because the toggles in the prior art structures were necessarily coordinated in operation to elevate the platform evenly, and thus no tilt adjustment was provided to permit platform alignment with another surface to or from which a load was to be transferred. For example, in transporting palletized loads to and from cargo aircraft, helicopters, and the like, wherein both the trailer and aircraft load-supporting surfaces are provided with anti-friction devices such as rollers, the loading or unloading operation was substantially hampered by an inability to align the platform of the trailer with the cargo supporting surface of the aircraft, particularly if the operation was conducted on rough terrain.

Accordingly, it is a primary object of the present invention to provide a toggle-operated, elevating-platform trailer wherein the toggles are interconnected by unique toggle actuating mechanisms which permit not only elevational motion of the platform but also permit operation of only selected toggles whereby the trailer platform can be tilted about one or more axes.

To accomplish this object, the present invention provides a trailer base having ground engaging wheels, a pallet-supporting platform adapted for elevation with respect to the trailer base, and a plurality of toggles connected with their opposite ends respectively pivoted on the trailer base and on the elevtaing platform. The toggle center pivots are moved relative to each other so as to elevate the platform by a unique and advantageous drive arrangement which permits selective operation of all toggles together or only the toggles along a side of the trailer or only the toggles at an end of the trailer. More specifically, the toggle drive arrangement includes two longitudinally oriented connecting mechanisms incorporating threaded shafts to accomplish simultaneous movement of the center pivot points of the toggles along each side of the trailer. The threaded shafts of the respective connecting mechanisms are interconnected by a transverse chain-drive arrangement to coordinate the action of the two longitudinal connecting mechanisms. Further, a mechanism is provided to render inoperative the normal coordinating function of the transverse chain drive whereby one of the longitudinal connecting mechanisms may be actuated independently of the other to thereby roll the platform trailer about a longitudinal axis. Further, a novel device is provided at one end of each of the longitudinal connecting mechanisms to simultaneously move the center pivots of the adjacent toggles relative to this end of the connecting mechanisms. This device thereby permits operation of these toggles independently of the toggles at the other end of the trailer to permit the trailer platform to be pitched about a transverse axis.

Other objects of the present invention are:
(1) The provision of elevating platform trailers operated by toggle mechnisms having unique and improved versatility;
(2) The provision of simplified platform operating mechanisms in tilting, elevating pallet-carrying trailers;
(3) The provision of improved toggle-operated, elevating-platform structures wherein selective toggle actuation effects elevation, roll, and pitch of the platform;
(4) And provision of improved, high-power toggle linkages in elevating-platform trailers.

Figure 2:
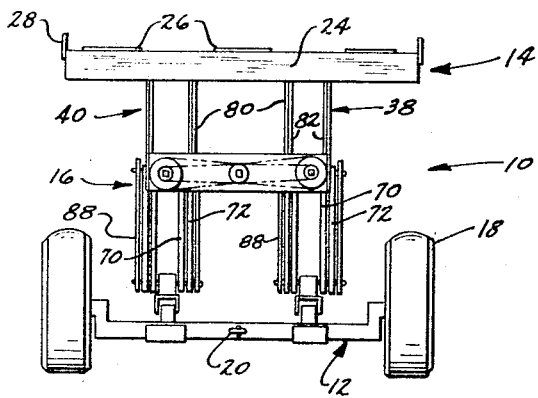
Figure 4:
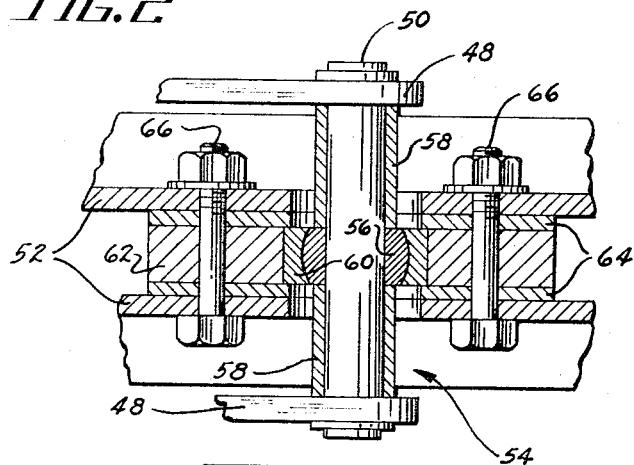

These and other objects of the present invention will become more fully apparent from the description and appended claims when read in conjunction with the accompanying drawings wherein:

FIGURE 1 is a side view of the elevating-platform trailer of the present invention;
FIGURE 2 is a front view of the trailer of FIGURE 1;
FIGURE 3 is a fragmentary top view of the generally rectangular arrangement of elevating toggle linkage and drive mechanisms of the trailer of FIGURE 1; and
FIGURE 4 is a horizontal section taken substantially on line 4—4 of FIGURE 1.

Referring to the drawings in greater detail, trailer 10 (FIGURES 1 and 2) of the present invention has a base 12, a load or pallet supporting platform 14, and an elevating mechanism 16 connected therebetween. Base 12 has any suitable conventional construction and includes ground engaging wheels 18 and a draft means such as a draw bar or a draw eye 20. Base 12 further includes stops or posts 19 which abut with a lower surface of platform 14 to establish a lower positional limit for the platform.

Elevating platform 14 is made up of a suitable framework 24 mounting a plurality of antifriction devices or rollers 26 which protrude above the frame to provide a load supporting surface 27 for the platform. Tie down rings 28 are provided for securing a palletized load on the platform roller surface.

Elevating mechanism 16 includes left and right rear toggles 32 and 34, respectively (FIGURE 3) and compound left and right forward toggles 38 and 40, respectively. Rear toggles 32 and 34 each have a lower arm 42 pivotally secured at its lower end by a mount 44 (FIGURE 1) to trailer base 12 and pivotally connected at its upper end to a toggle center pin 46. Toggles 32 and 34 further include upper arms 48 (FIGURE 3) pivotally connected at their lower ends to center pins 46 and pivotally connected at their upper ends to pins 50 which are connected to suitable portions such as angles 52 of platform 14 through a universal or spherical bearing assembly 54 provided to accommodate the roll of the platform with respect to the trailer base.

As shown in greater detail in FIGURE 4, each spherical bearing assembly 54 includes an inner spherical bushing 56 mounted on one of the pins 50 and retained in place thereon by spacers 58 which abut upper arms 48. Inner bushing 56 mates with an outer spherical bushing 60 which is securely mounted in a bearing mounting plate 62 by bearing retaining plates 64. Plates 62 and 64 are secured to the angle structure 52 of the trailer platform by mounting bolts 66.

At the forward end of trailer 10, compound toggles 38 and 40 (FIGURE 3) each include lower arms 70 and 72 respectively pivoted at their lower ends in fixed positions on base 12 by mounts 74 (FIGURE 1). Lower arms 70 and 72 are pivoted at center pins 76 and 78, respectively, to upper arms 80 and 82 which are pivotally connected by upper pins 84 to the trailer platform 14. Upper pivot pins 84 are each mounted in a spherical bearing assembly 86 similar to that shown in FIGURE 4. Toggles 38 and 40 further include stabilizing arms 88 also pivotally mounted on center pins 76 and pivotally secured to lower arms 72 at pivot pins 90.

To actuate the above-described toggles, the following coordinating and driving mechanism is provided. Threaded shafts 94 extend from threaded blocks 96 of center pins 76 to thrust-bushing blocks 98 of center pins 78. Shafts 94 rotatably extend through apertures in a transverse drive-mounting beam 100 which is secured to both blocks 98. Forward of beam 100 chain sprockets 102 and 104 are respectively mounted in non-rotative relation upon the shafts. Sprockets 102 and 104 are driven by two chains 106 which respectively engage chain sprockets 108 and 110 which are rotatively mounted upon a sprocket pin 112 mounted in the center of beam 100. Chain sprockets 108 and 110 are rotationally secured together by a lug and groove arrangement 114. By this structure sprockets 108 and 110 can be operationally disconnected by pushing rearwardly on a push disc 118 which is connected to sprocket 108, both of which slide axially on pin 112. A crank-receiving drive hub 120 is rotationally fixed upon chain sprocket 110, and a hand operated crank 122 (FIGURE 1) can be fitted over hub 120 to directly drive sprocket 110.

To achieve a greater mechanical advantage for cranking the platform, chain sprockets 124 and 126 are provided on pin 112, both being rotationally fixed with respect to sprocket 110 and hub 120. Sprockets 124 and 126 are connected by respective drive chains 128 to chain sprockets 130 which are rotatively mounted on the outer extremity of each shaft 94. That is, sprockets 130 are free to rotate upon shafts 94. Respective crank-receiving drive hubs 132 are rotationally fixed to chain sprockets 130 and permit cranks 122 to be optionally placed thereon. The diameters of the respective chain sprockets are selected so that there is a mechanical advantage or a torque increase as crank power is transmitted to screw shafts 94 from the cranks. That is, sprockets 130 are smaller than sprockets 124 and 126; sprockets 124 and 126 are larger than sprockets 108 and 110; and sprockets 108 and 110 are smaller than sprockets 102 and 104.

To coordinate the operation of toggles 32 and 38 and of toggles 34 and 40, that is parallel toggle pairs, a longitudinal connecting structure is provided. Thus connecting bars 140 extend from a pivotal connection at forward toggle center pins 76 to a pivotal and sliding connection with after toggle center pins 46. As shown in FIGURE 1, rear center pins 46 are mounted in longitudinal slots 142 provided in connecting bars 140. To control the position of center pins 46 in slots 142, the pins are provided with threaded blocks 144 interfitting with threaded shafts 146. The shafts extend through thrust bushings in transverse members 148 fixed across the rear end of connecting bars 140. Chain sprockets 150 are rotationally fixed on shafts 146 and can be driven by crank hubs 152 mounted thereon. Chain sprockets 150 are interconnected by a coordinating drive chain 154 extending transversely across the rear end of the trailer. Further, a tie bar 156 is provided to prevent relative lateral motion between the rear ends of connecting bars 140.

Operation of the pallet trailer of the present invention is as follows. To raise or lower platform 14, crank 122 is placed on crank hub 120 and rotated so as to directly drive chain sprocket 110 and 108 and to indirectly drive chain sprockets 102 and 104 at a mechanical advantage through chains 106. Rotation of chain sprockets 102 and 104 and the threaded shafts 94 connected thereto results in axial motion of threaded blocks 96 along the threaded shaft toward or away from blocks 98. The relative motion between blocks 96 and 98 causes compound toggles 38 and 40 to extend or retract vertically. A similar extension or retraction of rear toggles 32 and 34 is induced by connecting bars 140. If greater power is required to raise the platform, crank handle 122 can be shifted to either crank hub 132 and an additional mechanical advantage is achieved through the transmission of power through chains 128. Still greater power can be applied by simultaneously cranking both the outer crank hubs 132.

In order to align trailer platform 14 with another load supporting surface such as that in an aircraft or helicopter, disc 118 is pushed rearwardly to disconnect the lug and groove arrangement at 114. Then upon rotation of any of the crank hubs 120 or 132 only the longitudinally-oriented pair of toggles 32 and 38 on the left side of the trailer are actuated to either raise or lower that side of the platform. Thus, in this operation the platform rolls about a longitudinal axis through spherical bearing assemblies 54 and 84 on the right side of the trailer.

The trailer platform can be pitched about a transverse axis by cranking on either or both of the rear crank hubs 152 to turn threaded shafts 146 and thereby actuate the transversely-oriented pair of rear toggles 32 and 34, independently of front toggles 38 and 40, within the limits imposed by the length of grooves 142 in the connecting bars. In this manner platform 14 pitches up or down about the axis through upper pivot pins 84 at the forward end of the trailer.

In summary, the invention provides in elevating platform trailers a unique toggle elevating mechanism which permits not only elevational motion of the platform but also permits tilting of the platform about either of two perpendicularly-related axes through independent and selective operation of certain of the elevational toggle mechanisms.

As this invention may be embodied in several forms without departing from the spirit or essential characteristics thereof, the present embodiment is illustrative and not restrictive. The scope of the invention is defined by the appended claims rather than by the description preceding them, and all embodiments which fall within the meaning and range of equivalency of the claims are therefore intended to be embraced by those claims.

What is claimed is:
1. A toggle-operated elevating-platform trailer having four rectangularly related elevating toggles and toggle-operating drive means for actuating said toggles in pairs, said drive means actuating at least two perpendicularly-related pairs of toggles independently whereby the trailer platform can be selectively tilted about perpendicular axes, said toggle-operating drive means including parallel bar means respectively interconnecting the toggle center pivots of parallel pairs of toggles whereby both toggles in a pair can operate together and further including means to simultaneously vary the effective length of said respective bar means whereby one toggle of each of the parallel pairs can be operated independently of the other toggles of these pairs.

2. A trailer as defined in claim 1, said means to simultaneously vary the length of said respective bar means comprising:
 (a) threaded shafts connected between the center pivot of said one toggle in each pair and a portion of said bar means;
 (b) and means to rotate both shafts in coordination.

3. A pallet trailer comprising:
 (a) a trailer base;
 (b) a pallet-supporting platform;
 (c) a plurality of toggle linkages connected between said base and said platform, said toggle linkages being arranged whereby operation of one selection of toggle linkages effects a tilting of the platform about a first axis and operation of another selection of toggle linkages effects a tilting of the platform about a second axis which is angularly related to said first axis;
 (d) and toggle drive means for independently operating the respective selections of toggle linkages.

4. An elevating-platform structure comprising:
 (a) a base;
 (b) a generally rectangular platform adapted for elevation with respect to said base;

(c) platform-elevating toggle means positioned beneath the corners of said platform and connected to said base;

(d) and toggle operating means adapted for selective operation of the toggle means at all corners simultaneously, for the operation of only the toggle means along one edge of said rectangular platform, and for the operation of only the toggle means along another platform edge which is perpendicularly related to said one edge.

5. A trailer for transporting and elevating palletized cargo loads comprising:

(a) a base having draft means and ground-engaging, trailer-supporting wheels;

(b) a pallet-supporting platform adapted to be adjustably positioned above said trailer base;

(c) four toggles each having its opposite ends respectively connected to said platform and said base to provide for vertical motion therebetween, two of said toggles being compound and including two opposite-acting single toggles;

(d) and drive means for moving the toggle center pivots to vertically extend and retract said toggles, said drive means comprising:

(1) threaded shafts respectively interconnecting the center pivots of each said compound toggle;

(2) selective chain drive means to drive both threaded shafts simultaneously or to drive only one threaded shaft;

(3) bar means respectively connecting one center pivot of each of said compound toggles to the center pivot of each of the other toggles;

(4) and means to adjust the effective length of both said bar means simultaneously to effect actuation of said other toggles independently of said compound toggles.

6. A trailer as defined in claim 5, said shafts each being threaded with respect to only one of the center pivots of said compound toggles and axially fixed in the other center pivot.

7. A trailer as defined in claim 5, said selective chain drive means comprising:

(a) sprockets connected to said threaded shafts;

(b) two coaxial sprockets respectively connected by chains to said threaded-shaft sprockets;

(c) crank drive means connected to at least one of said coaxial sprockets;

(d) and clutch means to engage and disengage said coaxial sprockets for selective co-rotation.

8. A trailer as defined in claim 3 including universal bearing means connecting said toggle linkages to said pallet-supporting platform, said first and second tilting axes being defined by and passing through respective pairs of said universal bearing means.

References Cited by the Examiner

UNITED STATES PATENTS

| 521,127 | 6/1894 | Putt. | |
|---|---|---|---|
| 934,949 | 9/1909 | Trickey et al. | 254—7 |
| 2,023,410 | 12/1935 | Davis et al. | 254 |
| 2,471,901 | 5/1949 | Ross | 254—9 |

FOREIGN PATENTS 338,446  11/1930  Great Britain.

WILLIAM FELDMAN, *Primary Examiner.*

MILTON S. MEHR, *Examiner.*